H. WACHENHEIMER.
SPRING RING.
APPLICATION FILED APR. 7, 1919.

1,386,746.

Patented Aug. 9, 1921.

Inventor
Harry Wachenheimer

By Howard E Barlow
Attorney

UNITED STATES PATENT OFFICE.

HARRY WACHENHEIMER, OF PROVIDENCE, RHODE ISLAND, ASSIGNOR TO WACHENHEIMER BROS., OF PROVIDENCE, RHODE ISLAND, A FIRM.

SPRING-RING.

1,386,746.      Specification of Letters Patent.      Patented Aug. 9, 1921.

Application filed April 7, 1919. Serial No. 287,953.

*To all whom it may concern:*

Be it known that I, HARRY WACHENHEIMER, a citizen of the United States, and resident of Providence, in the county of Providence and State of Rhode Island, have invented certain new and useful Improvements in Spring-Rings, of which the following is a specification.

This invention relates to spring rings of the class more particularly adapted for use as connectors for the ends of metal chains for personal wear, and the object of this invention is to provide, on such a ring, a pivotally mounted eye member which is adapted to swivel or pivot and adjust itself to the required position.

With these and other objects in view, the invention consists of certain novel features of construction, as will be more fully described, and particularly pointed out in the appended claims.

Figure 1:
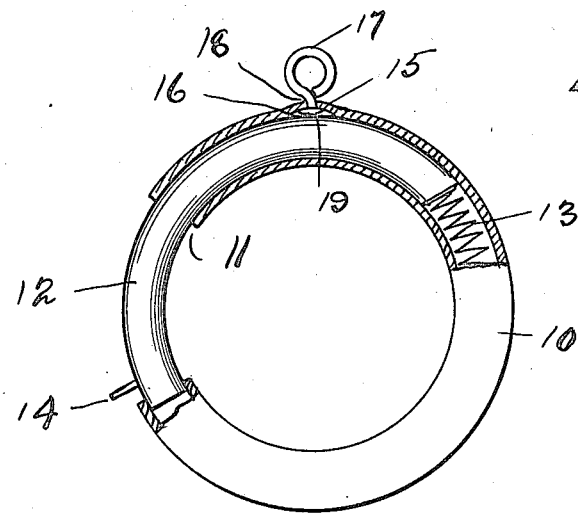

In the accompanying drawings:

Figure 1— is a side elevation partly in section, showing an eye member pivotally mounted in the wall of the tubular member.

Figure 2:
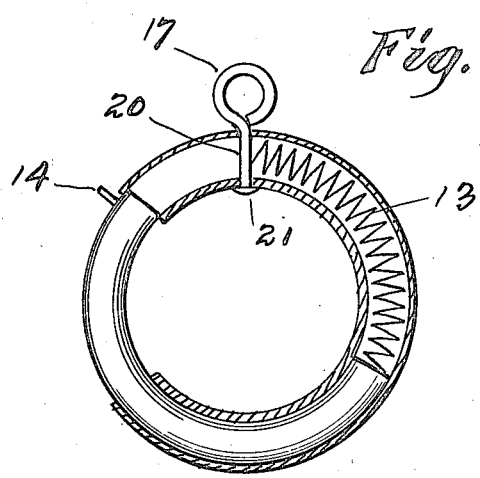

Fig. 2— is a sectional elevation of a ring, showing the shank of the eye as passing through both walls of the tubular body of the ring for the purpose of pivotally mounting the eye on the ring.

Figure 3:
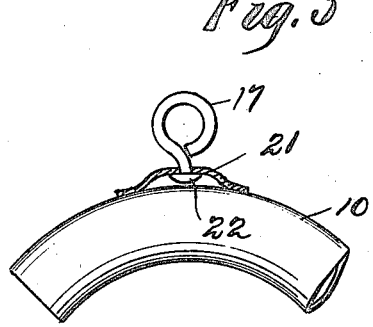

Fig. 3— is a view showing a portion of the tubular body of a spring ring and illustrating the eye member as pivotally secured on the tubular body by passing the shank of the eye through a cap and securing the cap to the body.

Referring to the drawings, 10 designates the tubular body portion of a spring ring a portion of which is removed as at 11 forming an open mouth thereinto.

In this tubular body is mounted a bolt member 12 which is adapted to slide within this body and is pressed normally to closed position by means of the spring 13, this bolt being provided with an operating pin 14.

My improvement comprises the connecting of a swivel-eye member to a member of the ring, to accomplish which in some cases I press the outer wall of the tubular member outwardly as at 15, see Fig. 1, forming a recess 16 therein. The eye member 17 is provided with a shank 18 which extends through an opening in the wall of this recessed portion 15 and a head 19 is formed on the inner end of this shank in this recess whereby this swivel eye is adapted to be rotated freely to adjust itself to the desired position.

Fig. 2 illustrates another means of pivotally connecting the eye member 17 to the tubular body, which is that of forming an elongated shank portion 20 on the eye member and passing this shank portion through both walls of the tube heading over the end 21 of this shank member on the under side of the tube.

Another means of pivotally securing the eye member 17 to the tubular body 10 is by passing the shank portion thereof through a separate and independent cup-shaped plate 21 and heading the shank over on the recessed side of the plate as at 22. The plate about the head is then secured by solder or otherwise to the tubular body. In all of these cases the eye member is pivotally mounted to freely turn or swivel when secured in position to the ring.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A spring ring comprising a tubular ring-shaped body having an opening thereinto, a bolt slidably mounted in said ring, and an attaching eye member pivotally mounted to swivel in the wall of the tubular body member of said ring and located out of the path of movement of said bolt so as not to interfere with the free action of the same.

2. A spring ring comprising a tubular ring-shaped body having an opening thereinto, a spring-pressed bolt slidably mounted in said ring, and an attaching eye member pivotally mounted to swivel in the wall of the tubular member of said ring and located out of the path of movement of said bolt but in position to provide an abutment for said spring.

In testimony whereof I affix my signature.

HARRY WACHENHEIMER.